United States Patent [19]

Lau

[11] 4,420,136

[45] Dec. 13, 1983

[54] MOUNTING ASSEMBLY

[75] Inventor: Donald W. Lau, Dubuque, Iowa

[73] Assignee: Deere & Company, Moline, Ill.

[21] Appl. No.: 271,485

[22] Filed: Jun. 8, 1981

[51] Int. Cl.³ .............................................. F16M 13/00
[52] U.S. Cl. ...................................... 248/674; 248/302
[58] Field of Search .............. 248/117.1, 117.3, 117.4, 248/117.5, 117.6, 117.7, 302, 303, 603, 604, 637, 674, 27.1

[56] References Cited

U.S. PATENT DOCUMENTS 2,086,102  7/1937  Stradling ......................... 248/117.1
2,096,621 10/1937  Skolfield ............................ 248/604
2,603,438  7/1952  Adams ........................... 248/302 X
2,896,886  7/1959  Slattery et al. ..................... 248/604
3,847,330 11/1974  Morrison ....................... 248/302 X Primary Examiner—William H. Schultz

[57] ABSTRACT

In a mounting assembly for the mounting of a fan motor in a vehicle wherein said mounting assembly includes a clip or brace secured to a fan motor having a plurality of mounting arms extending from the clip or brace. The mounting arms have a looped base portion whereupon a first section extends from the base portion and is fixably mounted to the clip and a second section extends to and is fixably mounted to an adjacent mounting arm.

2 Claims, 7 Drawing Figures

MOUNTING ASSEMBLY

BACKGROUND OF THE INVENTION

This invention refers to mounting assemblies, and more particularly, to mounting assemblies particularly suited for the mounting of motors such as electric fan motors to a support structure within a vehicle.

Mounting assemblies for electric motors such as fan motors associated with an air conditioning or heating system for a vehicle should represent a relatively light and easily installable assembly. A prior art mounting assembly, shown in FIG. 2a and 2b, illustrates an assembly which is of a relatively light weight and easily installed. However, such assemblies, when employed in an off-road vehicle, have exhibited insufficient rigidity, allowing the fan blade to strike a mating orifice. When the fan blade strikes the mating orifice, the fan may be thrown out of balance where after the ensuing vibration can cause a premature failure of the mounting assembly.

SUMMARY OF THE INVENTION

It is an object of the present invention to present a mounting assembly which is relatively light in weight and of sufficient rigidity so as to inhibit the fan blade from striking a mating orifice as the carrying vehicle travels over rough terrain.

A mounting system includes a clamping means which fits around the motor and a plurality of mounting arms. Each arm of a generally rod-like construction includes two linerally projecting portions extending from a looped base. A first linear portion is fixably mounted to the clip and the second linear portion extends angled from the first portion to be fixably mounted to an adjacent mounting arm. The loop portion allows the mounting arm to be secured to a mounting plate having a fan blade orifice.

DETAILED DESCRIPTION OF THE PREFERRED EMBODIMENT

Figure 1:
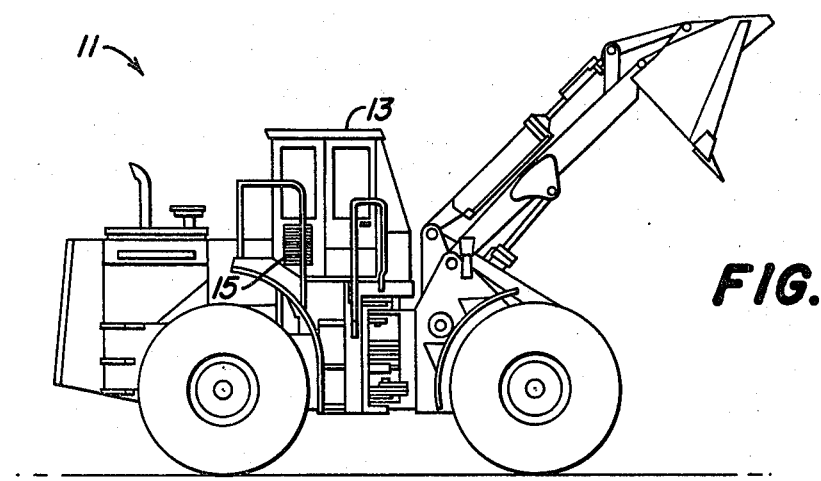
FIG. 1 is an elevated view of an off-road vehicle having cab air conditioning fans.

Referring to FIG. 1, a vehicle, in the specie of a wheel loader generally indicated as 11, includes a cab structure 13 having a louver door 15 hinged to the cab 13. The louvered door 15 maintains a plurality of fans (not shown) which can be used in conjunction with the cab heating or air conditioning system for air circulation.

Figure 2A:
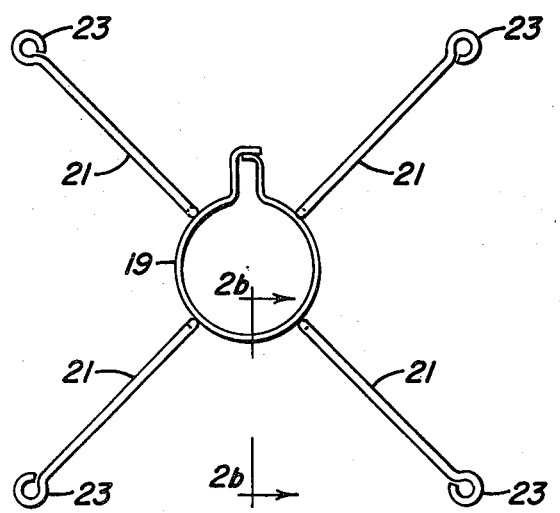
FIG. 2a is a front elevational view of the prior art mounting assembly.
Figure 2B:
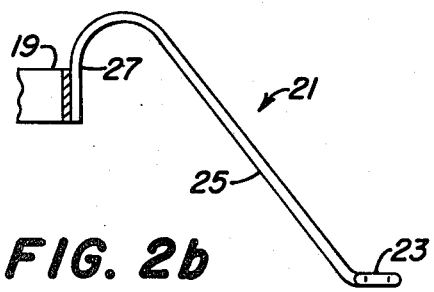
FIG. 2b is a side elevational view of the mounting assembly mounting arms along line 2—2.

Referring to FIG. 2a and 2b, a prior art mounting assembly includes a circular clamp or brace 19 which will fit around a fan motor. A plurality of mounting arms 21 extend radially from the circular clip 19. As viewed in FIG. 2b, each mounting arm 21 contains a looped base section 23 wherefrom an elevating linear section 25 extends. Linear section 25 arches to form a descending linear section 27 which is fixably mounted by a conventional means such as welding to the circular clip 19. It is observed from FIG. 2b that the elevation of the mounting arms allows the placement of a mounted fan motor to be removed perpendicularly from a mounting plate.

Figure 3A:
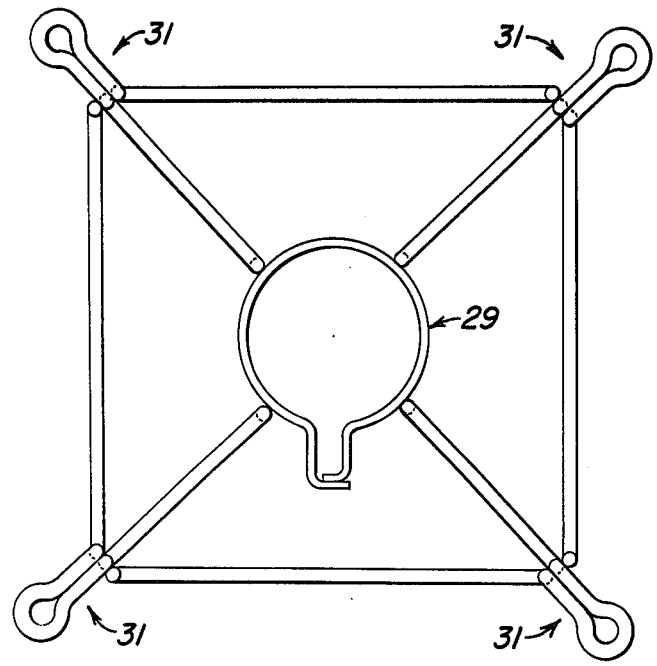
FIG. 3a is a front elevational view of a mounting assembly in accordance with the present invention.
Figure 3C:
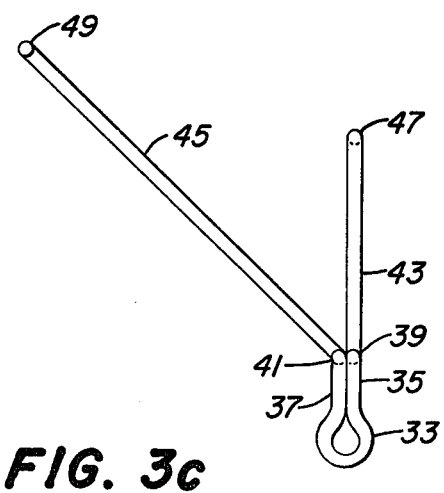
FIG. 3c is a front elevational view of a mounting arm in accordance with the present invention.
Figure 3B:
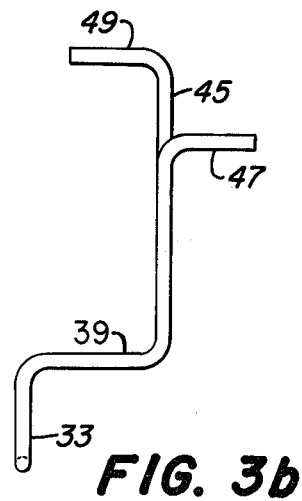
FIG. 3b is a side elevational view of a mounting arm in accordance with the present invention.

Referring to FIGS. 3a, b, and c, a mounting clip 29 similar to the mounting clip 19 aforedescribed, has a plurality of mounting arms 31 which are rod-like. A looped base section 33 is formed followed by parallel extending arms 35 and 37. Section 35 arches to assume a horizontally projecting section 39 wherefrom a vertically projecting section 43 is assumed. Thereafter, a horizontally projecting section 47 is assumed. Section 47 is fixably mounted to the clip 29 by any conventional means such as welding. Section 37 arches to assume a horizontally projecting section 41 followed by a vertically projecting section 45. The section 45 thereafter assumes a horizontally projecting section 49 and is fixably mounted by any conventional means such as welding to a second identical arm 31 along the arm section 39.

Figure 4:
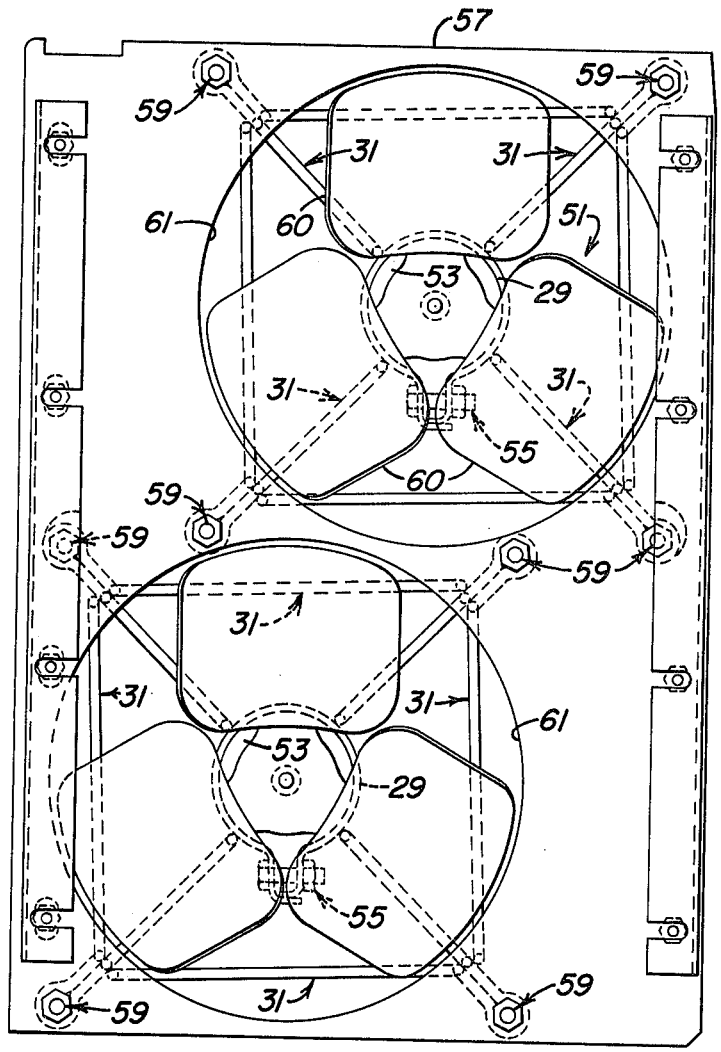
FIG. 4 is a front elevational view of the mounting assembly in accordance with the present invention mounting a fan to a support plate.

Referring more particularly to FIG. 4, it is observed that a plurality of fans 51 has a motor section 53 secured in a clip 29 by bolt and nut assemblies 55. The mounting arms 31 are secured to a mounting plate 57 by nut and bolt assembly 59 such that the fan blades 60 rotate within an orifice 61 within the mounting plate 57 without striking the sides. It is observed that the added mounting sections 37, 41, 45, and 49, give the support mounting structure additional rigidity to refrain the fan blades from contacting the conforming orifice.

I claim:

1. In a mounting assembly for mounting a motor such as an electric fan motor to a support means, said mounting assembly including a clamp fixably mounted to and extending around said motor's housing, a plurality of first mount arms, each being generally linear and rod-like fixably mounted at one end to said clamp in generally equal spaced apart relationship completely around said clamp and each of said arms having a loop portion at the other end fixably mounted to said support means, wherein the improvement comprises a plurality of second arms each fixably mounted at its respective ends to adjacent first mounting arms in close proximity to said respective loop, said second members in combination having generally an endless extension and generally forming individually a base portion of a triangle in combination with adjacent first members.

2. In a mounting assembly as claimed in claim 1 wherein said support means comprises a mounting plate and orifice, said mounting assembly being mounted to said mounting plate such that said fan blades are mating to said orifice.

* * * * *